US012387161B2

United States Patent
Kochura et al.

(10) Patent No.: US 12,387,161 B2
(45) Date of Patent: Aug. 12, 2025

(54) ASSESSING PROJECT QUALITY USING CONFIDENCE ANALYSIS OF PROJECT COMMUNICATIONS

(71) Applicant: International Business Machines Corporation, Armonk, NY (US)

(72) Inventors: Nadiya Kochura, Bolton, MA (US); Paul R. Bastide, Ashland, MA (US); Kelley Anders, East New Market, MD (US); Fang Lu, Billerica, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1175 days.

(21) Appl. No.: 17/170,096

(22) Filed: Feb. 8, 2021

(65) Prior Publication Data
US 2022/0253787 A1   Aug. 11, 2022

(51) Int. Cl.
*G06Q 10/0639*   (2023.01)
*G06F 40/289*    (2020.01)
(Continued)

(52) U.S. Cl.
CPC ..... *G06Q 10/06395* (2013.01); *G06F 40/289* (2020.01); *G06N 5/04* (2013.01);
(Continued)

(58) Field of Classification Search
CPC ........ G06Q 10/06395; G06Q 10/06313; G06F 40/289; G06F 40/30; G06N 5/04;
(Continued)

(56) References Cited

U.S. PATENT DOCUMENTS 10,726,374 B1 *   7/2020   Engineer ................. G06F 40/30
10,885,902 B1 *   1/2021   Papania-Davis .... G10L 15/1815
(Continued)

FOREIGN PATENT DOCUMENTS

CA    2267476 A1 *   9/1999   ............. G06Q 10/06
TR    201706600 A2 *   9/2017
WO    WO-9953390 A2 *   10/1999   ............. G06Q 30/02

OTHER PUBLICATIONS

Lappeenranta University of Technology, LUT, "Human and organizational factors influence software quality", ScienceDaily, Aug. 11, 2015, https://www.sciencedaily.com/releases/2015/08/150811091913.htm.
(Continued)

*Primary Examiner* — Daniel C Washburn
*Assistant Examiner* — Penny L Caudle
(74) *Attorney, Agent, or Firm* — Garg Law Firm, PLLC; Rakesh Garg; Michael O'Keefe

(57) ABSTRACT

An embodiment trains a machine-learning model using a first training corpus of general items indicative of varying levels of confidence. The embodiment also prepares a second training corpus that includes domain-specific items indicative of varying levels of confidence extracted from communications from members of a project group associated with a project. The embodiment retrains the machine-learning model using the second training corpus and generates a confidence score for the project based on confidence values assigned by the machine-learning model to each of a plurality of project-related communication items from members of the project group. The embodiment also detects that the confidence score is below a predetermined threshold confidence level and, in response, initiates a communication to members of the project group conveying information regarding an automated remedial action for the project.

19 Claims, 8 Drawing Sheets

(51) Int. Cl.
*G06N 5/04* (2023.01)
*G06N 20/00* (2019.01)
*G06Q 10/0631* (2023.01)
*G10L 15/06* (2013.01)
*G10L 15/18* (2013.01)
*G10L 25/63* (2013.01)

(52) U.S. Cl.
CPC ....... *G06N 20/00* (2019.01); *G06Q 10/06313* (2013.01); *G10L 15/063* (2013.01); *G10L 15/18* (2013.01); *G10L 25/63* (2013.01)

(58) Field of Classification Search
CPC ........ G06N 20/00; G06N 3/08; G10L 15/063; G10L 15/18; G10L 25/63; G10L 15/26; G10L 25/30
See application file for complete search history.

(56) References Cited

U.S. PATENT DOCUMENTS

| | | | |
|---|---|---|---|
| 11,456,082 B2* | 9/2022 | Ito | G16H 10/60 |
| 2003/0208388 A1 | 11/2003 | Farkas et al. | |
| 2011/0054968 A1* | 3/2011 | Galaviz | G06Q 10/0635 |
| | | | 705/7.41 |
| 2016/0189037 A1* | 6/2016 | Pereg | G06N 7/01 |
| | | | 706/12 |
| 2016/0196511 A1 | 7/2016 | Anisingaraju et al. | |
| 2016/0232003 A1 | 8/2016 | Kompella | |
| 2016/0307133 A1 | 10/2016 | Kour et al. | |
| 2017/0032308 A1 | 2/2017 | Cunico et al. | |
| 2018/0107984 A1* | 4/2018 | Bender | G06Q 10/1093 |
| 2019/0102685 A1* | 4/2019 | Foster | G10L 15/1822 |
| 2019/0347095 A1 | 11/2019 | Adams et al. | |
| 2020/0110858 A1* | 4/2020 | Lyu | G06N 20/20 |
| 2020/0192980 A1 | 6/2020 | Perumalla et al. | |
| 2021/0011823 A1* | 1/2021 | Guim Bernat | G06F 11/263 |
| 2021/0326527 A1* | 10/2021 | Poirel | G06F 21/316 |

OTHER PUBLICATIONS

Wesson et al., Verbal Expressions of Confidence and Doubt, Psychological Reports, 105, 151-160, 2009.
Kalai et al., On-Line Algorithms for combining Language Models, 2020.
Plank, Domain adaptation for parsing, University of Groningen, 2011.
Daume III, Frustratingly Easy Domain Adaptation, 2007.
Sun et al., Return of Frustratingly Easy Domain Adaptation, Dec. 9, 2015.

* cited by examiner

ASSESSING PROJECT QUALITY USING CONFIDENCE ANALYSIS OF PROJECT COMMUNICATIONS

BACKGROUND

The present invention relates generally to a method, system, and computer program product for project management. More particularly, the present invention relates to a method, system, and computer program product for assessing project quality using confidence analysis of project communications.

Artificial intelligence (AI) technology has evolved significantly over the past few years and have given way to a new class of devices referred to as AI virtual assistants. AI virtual assistants are able to understand and respond to voice commands due in part to advances in various types of AI technologies.

For example, an Artificial Neural Network (ANN)—also referred to simply as a neural network—is a computing system made up of a number of simple, highly interconnected processing elements (nodes), which process information by their dynamic state response to external inputs. ANNs are processing devices (algorithms and/or hardware) that are loosely modeled after the neuronal structure of the mammalian cerebral cortex but on much smaller scales. A large ANN might have hundreds or thousands of processor units, whereas a mammalian brain has billions of neurons with a corresponding increase in magnitude of their overall interaction and emergent behavior.

A Deep Learning Neural Network, referred to herein as a Deep Neural Network (DNN) is an artificial neural network (ANN) with multiple hidden layers of units between the input and output layers. Similar to shallow ANNs, DNNs can model complex non-linear relationships. DNN architectures, e.g., for object detection and parsing, generate compositional models where the object is expressed as a layered composition of image primitives. The extra layers enable composition of features from lower layers, giving the potential of modeling complex data with fewer units than a similarly performing shallow network. DNNs are typically designed as feedforward networks.

SUMMARY

The illustrative embodiments provide for assessing project quality using confidence analysis of project communications. An embodiment includes training a machine-learning model using a first training corpus of general items indicative of varying levels of confidence. The embodiment also includes preparing a second training corpus that includes domain-specific items indicative of varying levels of confidence extracted from communications from members of a project group associated with a project. The embodiment also includes retraining the machine-learning model using the second training corpus. The embodiment also includes generating a confidence score for the project based on confidence values assigned by the machine-learning model to each of a plurality of project-related communication items from members of the project group. The embodiment also includes detecting that the confidence score is below a predetermined threshold confidence level. The embodiment also includes initiating, responsive to the detecting of the confidence score being below the threshold confidence level, a communication to members of the project group conveying information regarding an automated remedial action for the project. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
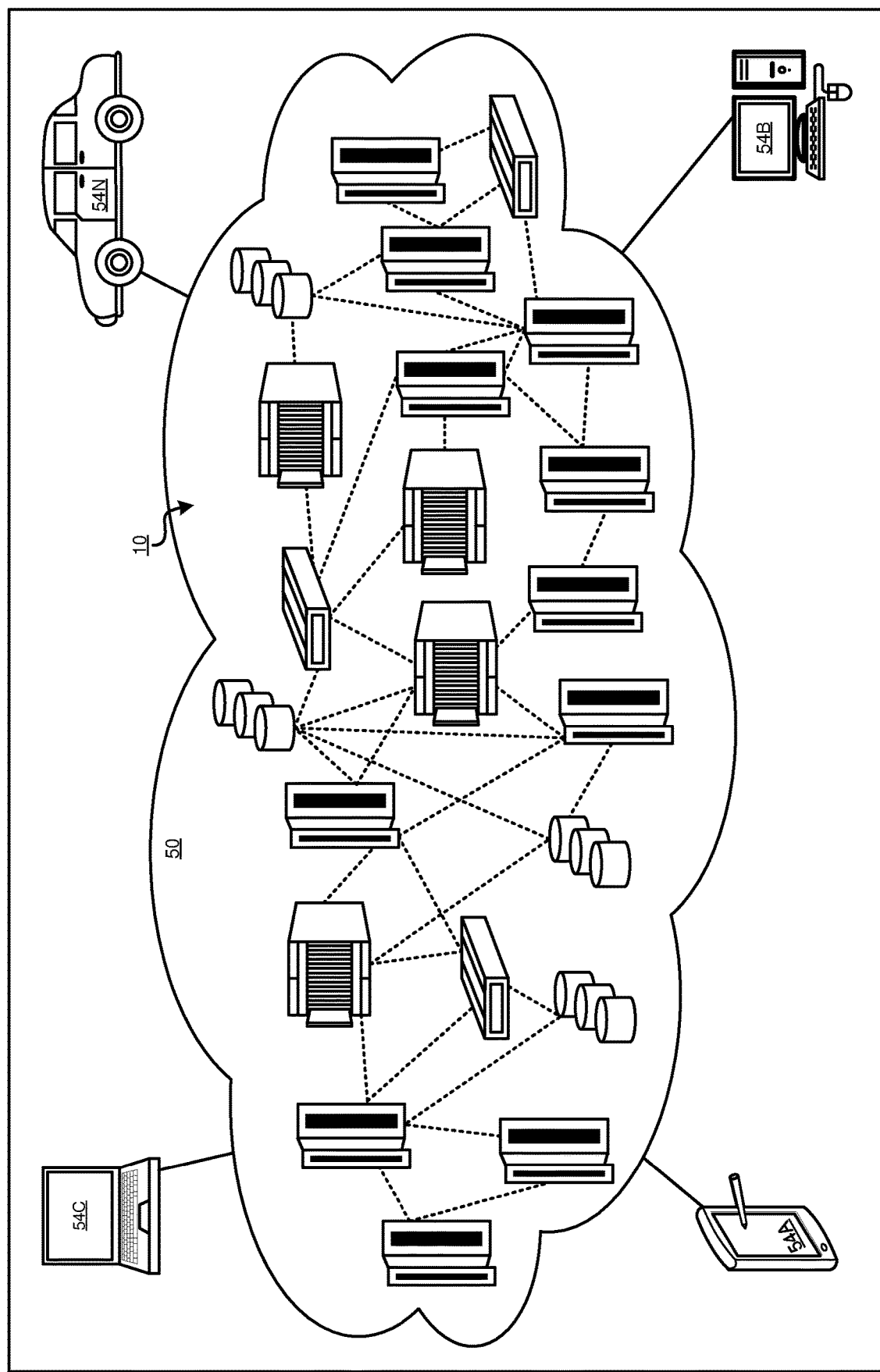
FIG. 1 depicts a cloud computing environment according to an embodiment of the present invention.

Software Management is a recognized knowledge area in major industrial and commercial activities, and covers several management disciplines such as Project Management or Risk Management, each having its own tools and methods of analysis. Another discipline of concern is Software Quality Management. Software Quality Management has been defined in the literature as being the concepts, methods, techniques, procedures, and standards for producing high-quality software products in an efficient and cost-effective manner.

Recent research has determined that the influence of human factors associated with a software development team is more significant than previously realized, and impacts both the development processes and the quality of software and data products that the team produces. While the tools, infrastructure, and other resources can have a positive impact on software quality, the methods of development have been found to have only a minor impact on quality of the output. Product development is an information-intensive process whereby organizational structures, modes of operation, and information-flow within an organization have varying levels of influence on the quality of a final software product. On the other hand, the organizational culture and the level of commitment of the team members working together on a software project play a key role in producing a high-quality final product.

Quality management systems include software aimed at standardizing and automating quality management tasks. Such systems help to relieve the burden associated with manual quality management programs, as well as reducing the risk of human error. Quality management systems include modules such as supplier selection, supplier audit management, technology qualification, part qualification, process changes, supplier quality management, and general quality problem resolution. As software systems, they rely on data from various records and test results, for example audit results, training, and compliance records.

The disclosed embodiments provide a solution to this technical problem by generally providing for continuous and autonomous evaluation of the project members' view of a product through analysis of a different medium, such as text and speech. Exemplary embodiments determine the team members' confidence in the product quality and data quality. Some embodiments also include an integrated confidence ranker for evaluating the overall team confidence in the quality of the product or data they are developing.

In the illustrated embodiment, a confidence analysis system extracts the confidence sentiments from the conversations across various project collaboration tools. The conversation is associated with a repository, feature, pull request or test related to a feature. In some embodiments, the system evaluates the comments maker's profile data and the corresponding expertise level in the relevant domain. In some embodiments, the system adds weight to commentary from certain team members, such as those with high levels of experience. The weight allows the commentary from more senior or expert team members to be emphasized in the analysis.

In an illustrative embodiment, a confidence analysis system provides automated evaluation of communications from or among members of a project group and generates a confidence level score indicative of a perceived level of confidence that the members have in the quality of the project. In some embodiments, the confidence analysis system integrates the confidence level score with other quality metrics as part of an automated project quality assessment system.

In an illustrative embodiment, the confidence analysis system leverages artificial intelligence technology to evaluate communications and generate a confidence level score based on the communications. The confidence analysis system first trains a generic model to determine confidence level of text using generic confidence-level related data. The confidence analysis system then retrains the machine-learning model using a corpus of data specific to the members of a project group for a project to be evaluated. This allows system to generate a domain model using any unique vocabulary and styles of expressing sentiments used by the members of the project group. The result is a domain-specific project confidence model that identifies the most typical and generic ways to express levels of confidence by including both typical generic terms and project-specific terms in the training data.

In an illustrative embodiment, the system trains the generic model using generic corpus data from a data source. In some embodiments, the generic corpus data includes common phrases used in general speech and that convey various levels of confidence. In alternative embodiments, the generic corpus data includes other types of data. For example, in some embodiments, the generic corpus data includes audio data in which audible indicators, such as the tone or pace of speech of the speaker, is used as an indicator of a level of confidence. As another example, in some embodiments, the generic corpus data includes video or image data in which visual indicators, such as facial expression or posture of a speaker, is used as an indicator of a level of confidence. The system uses the generic corpus data to train the machine-learning model to predict levels of confidence conveyed by input data. In some embodiments, the system generates the machine-learning model as a classifier that classifies the input data according to different levels of confidence. For example, in some embodiments, the machine-learning model classifies input data conveying a high level of confidence, conveying a moderate level of confidence, or conveying a low level of confidence. Embodiments of the system employ supervised, unsupervised, or semi-supervised (e.g., active learning) training techniques to train the model. When the system completes the training of the machine-learning model, the system stores the machine-learning model in memory.

In an illustrative embodiment, the system generates a domain-specific corpus of data that will be used to retrain the machine-learning model to be trained for evaluating a particular project. To this end, the system generates the domain-specific corpus using items indicative of varying levels of confidence that originated from members of a group involved in the project, such as data extracted from communications by or among the group members. In some embodiments, the system detects distinguishing characteristics of the domain-specific items by comparing the items and parts of the items, such as words or phrases, to the items in the generic training corpus. The system then add the distinguishing items to the domain-specific corpus.

In some embodiments, the system uses items generated by group members during past projects and associates the items with quality metrics of the past projects. In such embodiments, the system generates labeled data that connects project quality with items that the group members generated while working on that project. For example, in some embodiments, the system associates a quality score of a past project with phrases extracted from communications from a group member while working on that past project.

In some embodiments, the system uses natural language processing (NLP) of unstructured text from the communications to extract target phrases indicative of confidence levels. For example, in some embodiments, the system uses NLP of audio communications to generate a transcript using speech-to-text processing.

In some embodiments, it may be desirable to emphasize the viewpoints of one or more particular members of the project group, for example due to a group member's level of experience, expertise, or seniority. In some such embodiments, the system correlates the items in the corpus with respective group members associated with the items, for example an audio transcript is associated with the group member that was speaking in the audio recording and a phrase from a report is associated with the group member who authored the report. In some such embodiments, the system assigns weights to the items associated with the group member or members that are selected for emphasis.

In an illustrative embodiment, the system uses the domain-specific corpus to retrain the machine-learning model. In some embodiments, the system obtains a copy of the machine-learning model from memory, leaving a copy of the machine-learning model for use for other projects. In some embodiments, the system trains the machine-learning model to assign confidence values to input data, such as project-related communication items from members of the project group.

In an illustrative embodiment, the system uses the confidence values to generate an overall confidence score for the specific project under evaluation. In some embodiments, the system includes additional project metrics in the process of calculating the confidence score for the project. For example, in some embodiments, the system calculates or adjusts the confidence score based on test results, failures, adherence to schedule, or other quality metrics. In some embodiments, the confidence analysis system allows a user issue commands from the user device to the system to add, delete, or modify project metrics, including increasing or decreasing the weight of the various metrics used to calculate quality score for the project.

In an illustrative embodiment, the system receives one or more threshold score values from memory or from a user via the user device. The system compares the score to a threshold value in order to detect whether the confidence score is acceptable or not acceptable. Alternatively, in some embodiments the system compares the score to a plurality of threshold values in to detect from among any number of levels of acceptability depending on the desired degree of granularity.

In an illustrative embodiment, the system detects if the results of the evaluation are below a desired level. If so, then the system automatically initiates remedial action. In some embodiments, a user pre-selects one or more remedial actions that should be initiated and associates them with possible evaluation results. There are many different possibilities for the types of remedial actions that may be triggered. For example, in some embodiments, the system issues a remedial action alert to project member systems. The project member systems may be computing devices, such as desktop, laptop, or tablet computers or smart phones. In some embodiments, the remedial action may include a meeting of the project members to discuss the results and concerns. In some embodiments, the remedial action alert may include a calendar notification that adds the meeting to the calendars of the project members. In some embodiments, the system issues the remedial action alert to initiate communication to the project members and accesses calendaring software of the project members to determine a time and date to schedule a meeting and to add the meeting to the members' schedules.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or component that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted for providing explanations for decisions made by a machine-learning classifier model, for example.

Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, contrastive explanations, computer readable storage medium, high-level features, historical data, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and personal digital assistants (PDAs)s).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
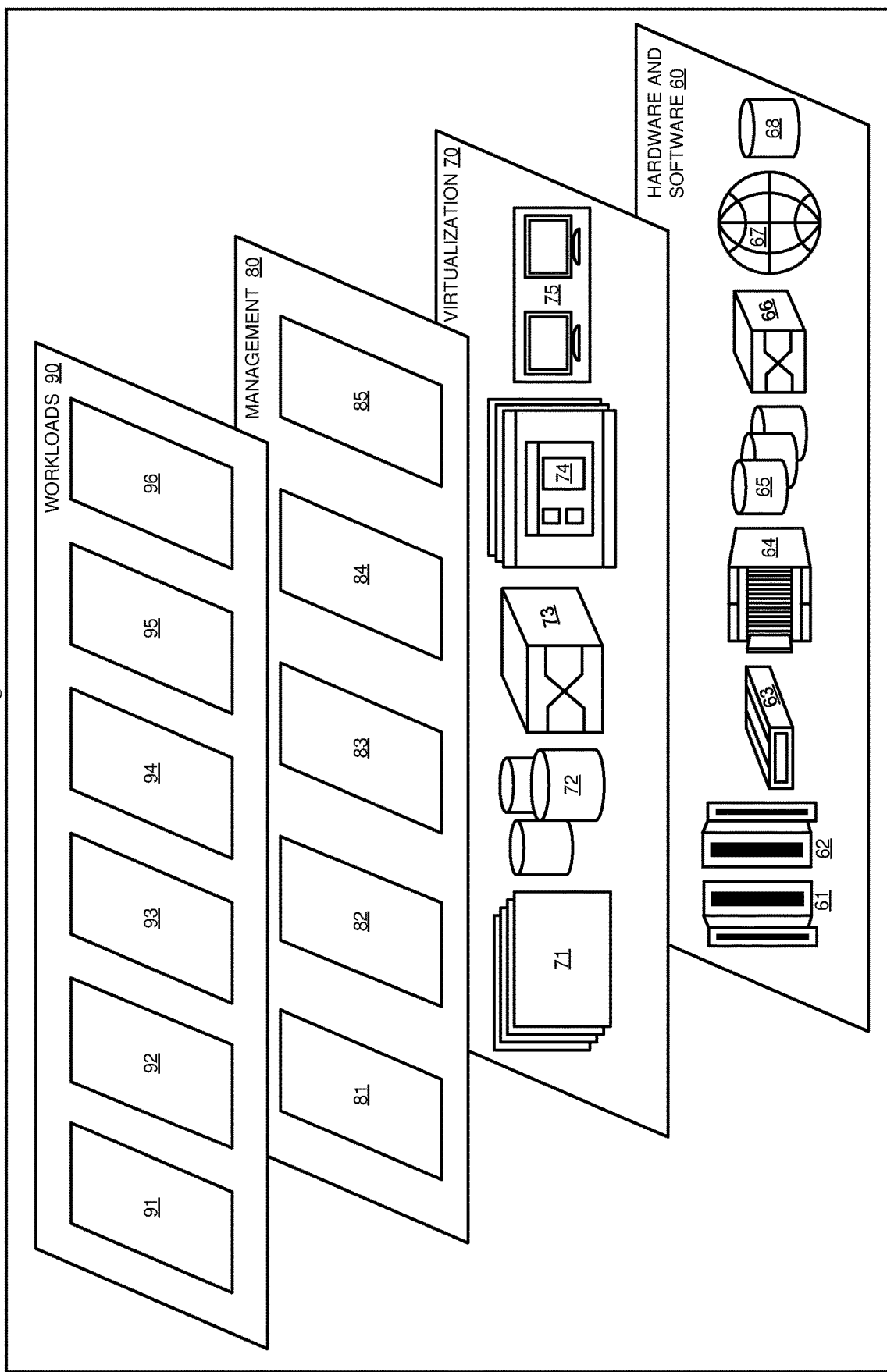
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and confidence analysis system 96.

Figure 3:
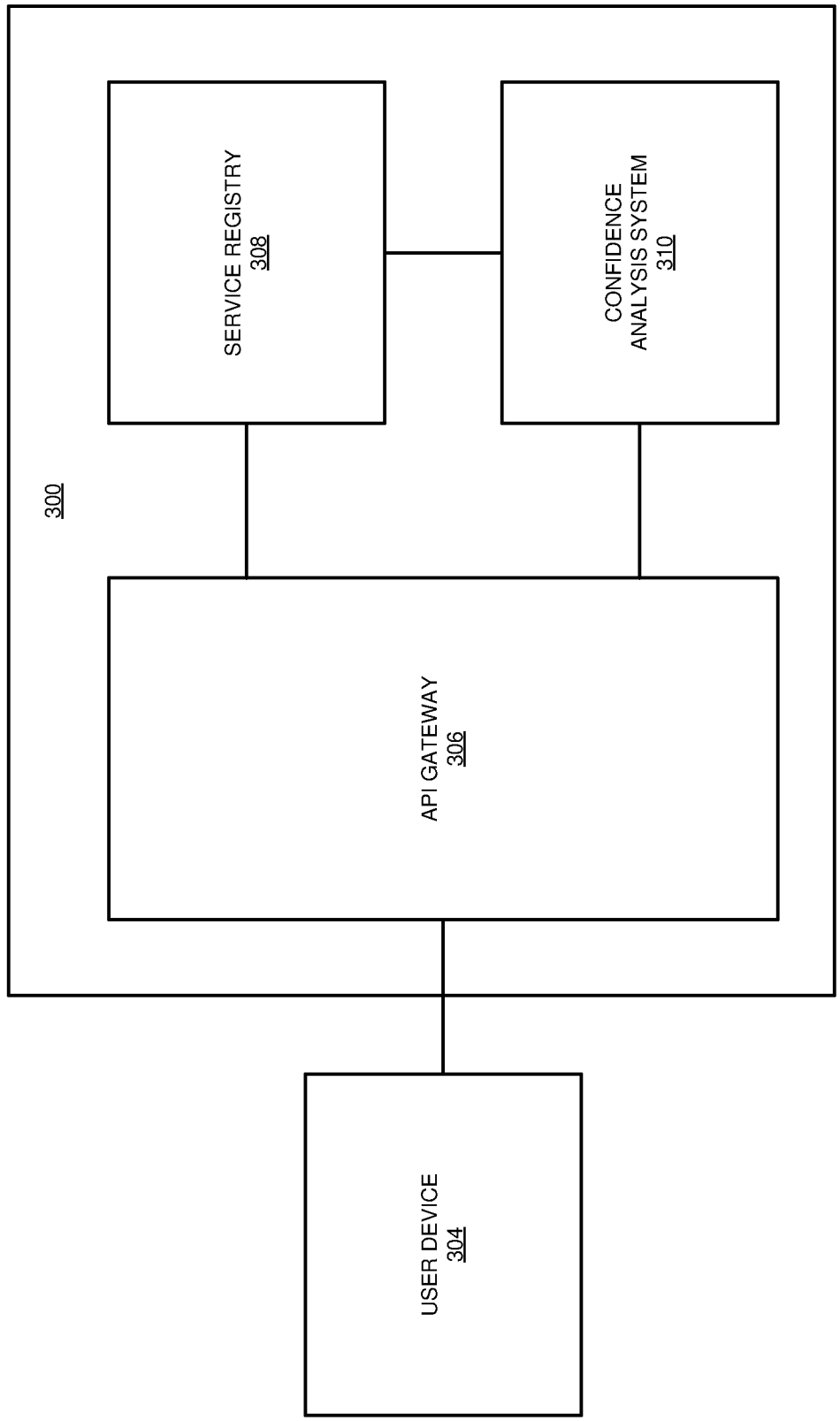
FIG. 3 depicts a block diagram of an example service infrastructure that includes the confidence analysis system in accordance with an illustrative embodiment.

With reference to FIG. 3, this figure depicts a block diagram of an example service infrastructure 300 that includes the confidence analysis system 310 in accordance with an illustrative embodiment. In some embodiments, the confidence analysis system 310 is deployed in workloads layer 90 of FIG. 2. By way of example, in some embodiments, confidence analysis system 310 is implemented as worker schedule processing 96 in FIG. 2.

In the illustrated embodiment, the service infrastructure 300 provides services and service instances to a user device 304. User device 304 communicates with service infrastructure 300 via an API gateway 306. In various embodiments, service infrastructure 300 and the confidence analysis system 310 serve multiple users and multiple tenants. A tenant is a group of users (e.g., a company) who share a common access with specific privileges to the software instance. Service infrastructure 300 ensures that tenant specific data is isolated from other tenants.

In some embodiments, user device 304 connects with API gateway 306 via any suitable network or combination of networks such as the Internet, etc. and use any suitable communication protocols such as Wi-Fi, Bluetooth, etc. Service infrastructure 300 may be built on the basis of cloud computing. API gateway 306 provides access to client applications like the confidence analysis system 310. API gateway 306 receives service requests issued by client applications, and creates service lookup requests based on service requests. As a non-limiting example, in an embodiment, the user device 304 is a card reader device that executes an access routine to determine whether to grant access to a workspace in response to a sensed access card.

In the illustrated embodiment, service infrastructure 300 includes a service registry 308. In some embodiments, service registry 308 looks up service instances of the confidence analysis system 310 in response to a service lookup request such as one from API gateway 306 in response to a service request from user device 304. For example, in some embodiments, the service registry 308 looks up service instances of the confidence analysis system 310 in response to requests related to dubbing and machine translation from the user device 304.

In some embodiments, the service infrastructure 300 includes one or more instances of the confidence analysis system 310. In some such embodiments, each of the multiple instances of the confidence analysis system 310 run independently on multiple computing systems. In some such embodiments, the confidence analysis system 310, as well as other service instances of the confidence analysis system 310, are registered in service registry 308.

In some embodiments, service registry 308 maintains information about the status or health of each service instance including performance information associated each of the service instances. For example, as described in more detail herein, such performance information may include various types of performance characteristics of a given service instance (e.g., cache metrics, etc.). As described in more detail herein, extended service registry 308 ranks service instances based on their respective performance characteristics, and selects top-ranking service instances for service discovery or service lookup requests. In the event that a service instance becomes unresponsive or, unhealthy, the service registry will no longer provide its address or information about this service instance to other services.

Figure 4:
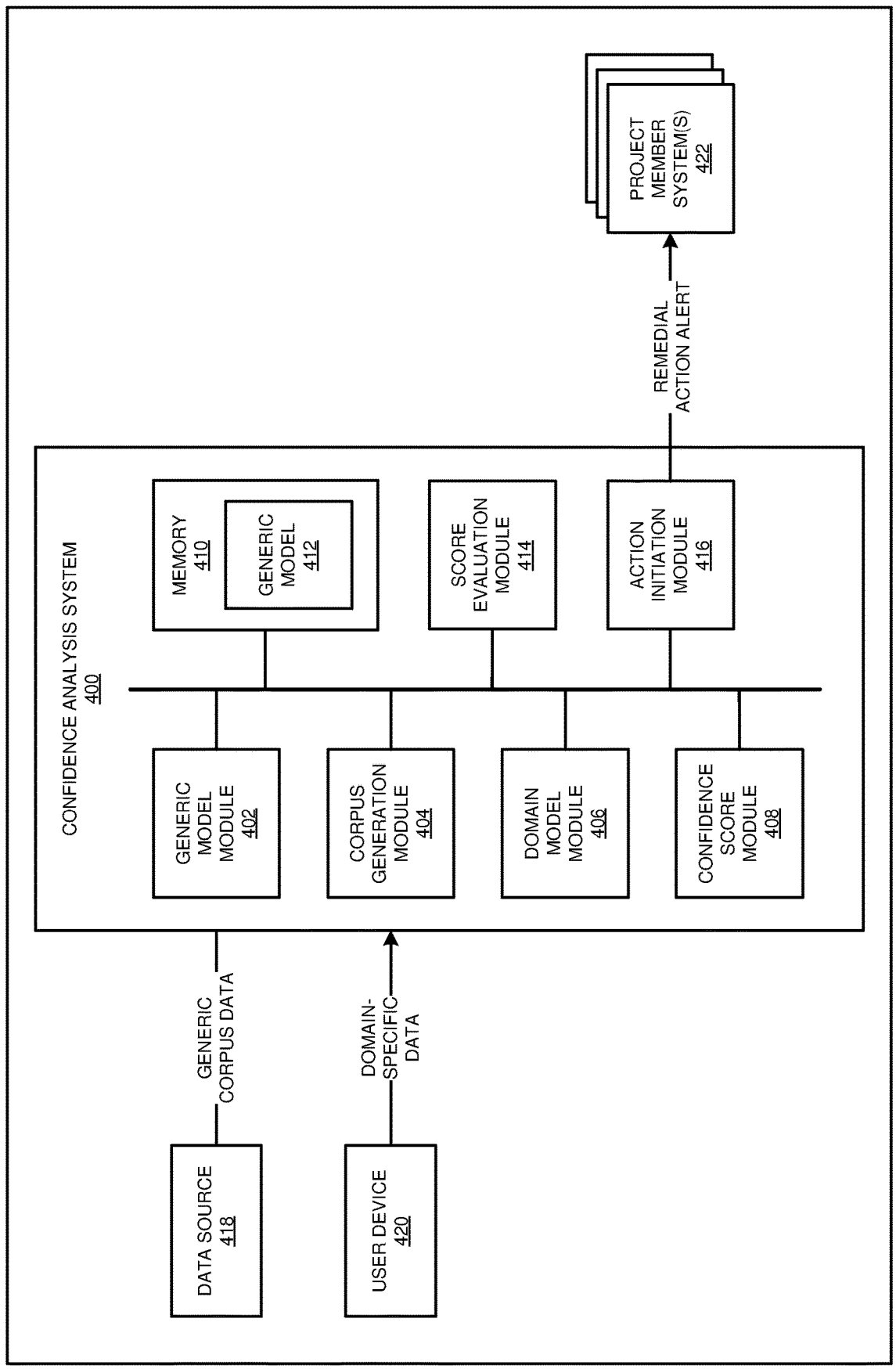
FIG. 4 depicts a block diagram of an example confidence analysis system accordance with an illustrative embodiment.

With reference to FIG. 4, this figure depicts a block diagram of an example confidence analysis system 400 accordance with an illustrative embodiment. In a particular embodiment, confidence analysis system 400 is an example of confidence analysis system 310 of FIG. 3.

In the illustrated embodiment, the confidence analysis system 400 includes a generic model module 402, a corpus generation module 404, a domain model module 406, a confidence score module 408, a memory 410, a score evaluation module 414, and an action initiation module 416. In alternative embodiments, the confidence analysis system 400 can include some or all of the functionality described herein but grouped differently into one or more modules. In some embodiments, the functionality described herein is distributed among a plurality of systems, which can include combinations of software and/or hardware based systems, for example Application-Specific Integrated Circuits (ASICs), computer programs, or smart phone applications.

In the illustrated embodiment, the confidence analysis system 400 provides automated evaluation of communications from or among members of a project group and generates a confidence level score indicative of a perceived level of confidence that the members have in the quality of the project. In some embodiments, the confidence analysis system 400 integrates the confidence level score with other quality metrics as part of an automated project quality assessment system.

In the illustrated embodiment, the confidence analysis system 400 leverages artificial intelligence technology to evaluate communications and generate a confidence level score based on the communications. The confidence analysis system 400 includes a generic model module 402 that first trains a generic model 412 to determine confidence level of text using generic confidence-level related data. The confidence analysis system 400 also includes domain model module 406 that retrains the machine-learning model 412 using a corpus of data specific to the members of a project group for a project to be evaluated. This allows domain model module 406 to generate a domain model using any unique vocabulary and styles of expressing sentiments used by the members of the project group. The result is a domain-specific project confidence model that identifies the most typical and generic ways to express levels of confidence by including both typical generic terms and project-specific terms in the training data.

In the illustrated embodiment, the generic model module 402 trains the generic model 412 using generic corpus data from a data source 418. In some embodiments, the generic corpus data includes common phrases used in general speech and that convey various levels of confidence. In alternative embodiments, the generic corpus data includes other types of data. For example, in some embodiments, the generic corpus data includes audio data in which audible indicators, such as the tone or pace of speech of the speaker, is used as an indicator of a level of confidence. As another example, in some embodiments, the generic corpus data includes video or image data in which visual indicators, such as facial expression or posture of a speaker, is used as an indicator of a level of confidence. The generic model module 402 uses the generic corpus data to train the machine-learning model 412 to predict levels of confidence conveyed by input data. In some embodiments, the generic model module 402 generates the machine-learning model 412 as a classifier that classifies the input data according to different levels of confidence. For example, in some embodiments, the machine-learning model 412 classifies input data conveying a high level of confidence, conveying a moderate level of confidence, or conveying a low level of confidence. Embodiments of the generic model module 402 employ supervised, unsupervised, or semi-supervised (e.g., active learning) training techniques to train the model 412. When the generic model module 402 completes the training of the machine-learning model 412, the generic model module 402 stores the machine-learning model 412 in memory 410.

In the illustrated embodiment, the corpus generation module 404 generates a domain-specific corpus of data that will be used to retrain the machine-learning model 412 to be trained for evaluating a particular project. To this end, the corpus generation module 404 generates the domain-specific corpus using items indicative of varying levels of confidence that originated from members of a group involved in the project, such as data extracted from communications by or among the group members. In some embodiments, the corpus generation module 404 detects distinguishing characteristics of the domain-specific items by comparing the items and parts of the items, such as words or phrases, to the items in the generic training corpus. The corpus generation module 404 then add the distinguishing items to the domain-specific corpus.

In some embodiments, the corpus generation module 404 uses items generated by group members during past projects and associates the items with quality metrics of the past projects. In such embodiments, the corpus generation module 404 generates labeled data that connects project quality with items that the group members generated while working on that project. For example, in some embodiments, the corpus generation module 404 associates a quality score of a past project with phrases extracted from communications from a group member while working on that past project.

In some embodiments, the corpus generation module 404 uses natural language processing (NLP) of unstructured text from the communications to extract target phrases indicative of confidence levels. For example, in some embodiments, the corpus generation module 404 uses NLP of audio communications to generate a transcript using speech-to-text processing.

In some embodiments, it may be desirable to emphasize the viewpoints of one or more particular members of the project group, for example due to a group member's level of experience, expertise, or seniority. In some such embodiments, the corpus generation module 404 correlates the items in the corpus with respective group members associated with the items, for example an audio transcript is associated with the group member that was speaking in the audio recording and a phrase from a report is associated with the group member who authored the report. In some such embodiments, the corpus generation module 404 assigns weights to the items associated with the group member or members that are selected for emphasis.

In the illustrated embodiment, the domain model module 406 uses the domain-specific corpus generated by the corpus generation module 404 to retrain the machine-learning model 412. In some embodiments, the domain model module 406 obtains a copy of the machine-learning model 412 from memory 410, leaving a copy of the machine-learning model 412 for use for other projects. In some embodiments, the domain model module 406 trains the machine-learning model 412 to assign confidence values to input data, such as project-related communication items from members of the project group.

In the illustrated embodiment, the confidence score module 408 receives the confidence values from the domain model module 406. The confidence score module 408 uses the values to generate an overall confidence score for the specific project under evaluation. In some embodiments, the confidence score module 408 includes additional project metrics in the process of calculating the confidence score for the project. For example, in some embodiments, the confidence score module 408 calculates or adjusts the confidence score based on test results, failures, adherence to schedule, or other quality metrics. In some embodiments, the confidence analysis system 400 allows a user issue commands from the user device 420 to the confidence score module 408 to add, delete, or modify project metrics, including increasing or decreasing the weight of the various metrics used to calculate quality score for the project.

In the illustrated embodiment, the score evaluation module 414 receives the quality score from the confidence score module 408. The score evaluation module 414 receives one or more threshold score values from memory 410 or from a user via the user device 420. The score evaluation module 414 compares the score to a threshold value in order to detect whether the confidence score is acceptable or not acceptable. Alternatively, in some embodiments the score evaluation module 414 compares the score to a plurality of threshold values in to detect from among any number of levels of acceptability depending on the desired degree of granularity.

In the illustrated embodiment, the score evaluation module 414 notifies the action initiation module 416 of the results of the evaluation. The action initiation module 416 detects if the results of the evaluation are below a desired level. If so, then the action initiation module 416 automatically initiates remedial action. In some embodiments, a user pre-selects one or more remedial actions that should be initiated and associates them with possible evaluation results. There are many different possibilities for the types of remedial actions that may be triggered. For example, in some embodiments, the action initiation module 416 issues a remedial action alert to project member systems 422. The project member systems 422 may be computing devices, such as desktop, laptop, or tablet computers or smart phones. In some embodiments, the remedial action may include a meeting of the project members to discuss the results and concerns. In some embodiments, the remedial action alert may include a calendar notification that adds the meeting to the calendars of the project members. In some embodiments, the action initiation module 416 issues the remedial action alert to initiate communication to the project members and accesses calendaring software of the project members to determine a time and date to schedule a meeting and to add the meeting to the members' schedules.

Figure 5:
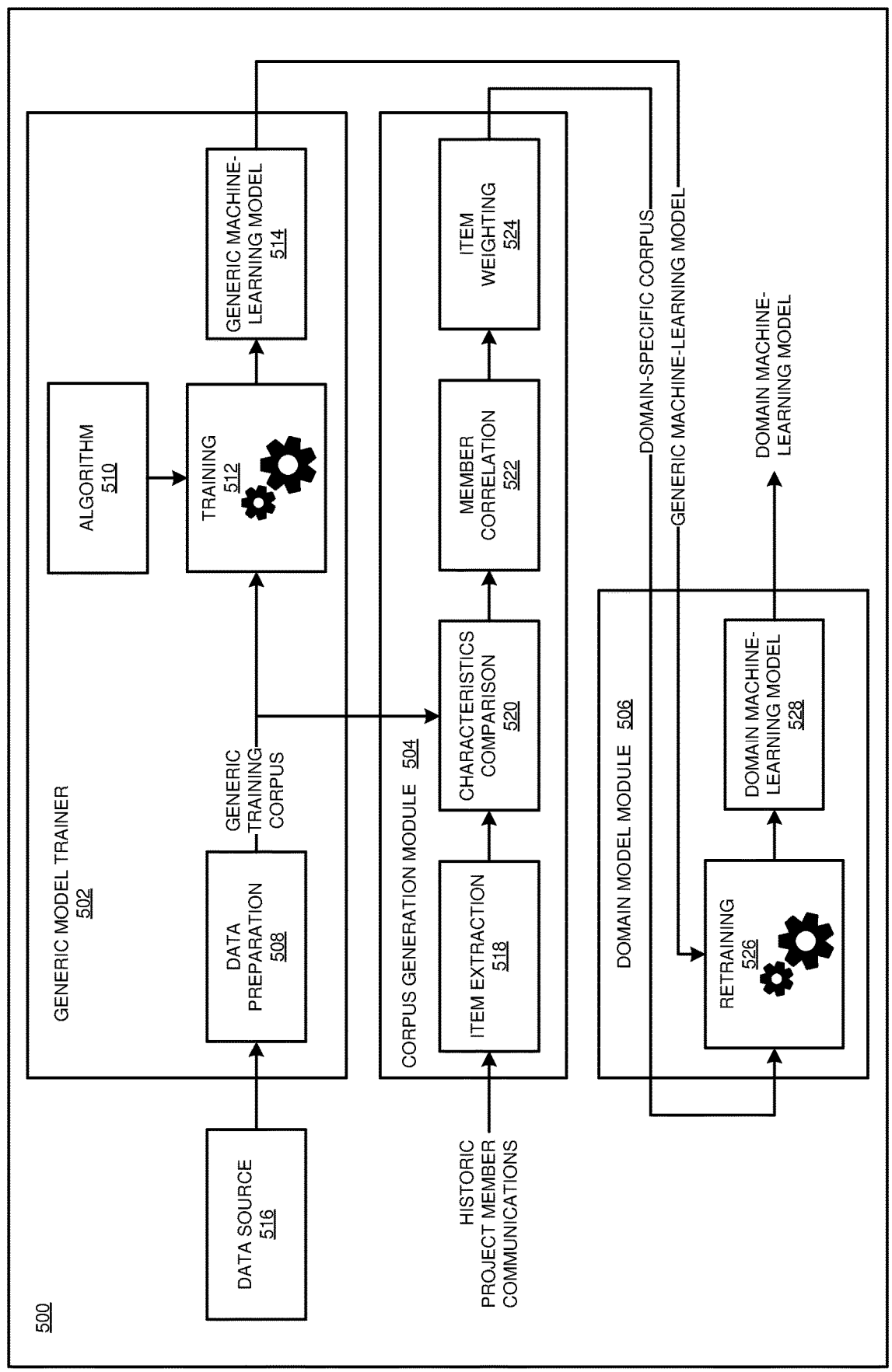
FIG. 5 depicts a block diagram of an example machine learning environment in accordance with an illustrative embodiment.

With reference to FIG. 5, this figure depicts a block diagram of an example machine learning environment 500 in accordance with an illustrative embodiment. In the illustrated embodiment, the machine learning environment 500 includes a generic model module 502, a corpus generation module 504, and a domain model module 506. In a particular embodiment, generic model module 502 is an example of generic model module 402 of FIG. 4, corpus generation module 504 is an example of corpus generation module 404 of FIG. 4, and domain model module 506 is an example of domain model module 406 of FIG. 4.

In the illustrated embodiment, the generic model module 502 includes a data preparation module 508, algorithm module 510, training module 512, and generic machine-learning model 514. In the illustrated embodiment, the corpus generation module 504 includes an item extraction module 518, a characteristics comparison module 520, a member correlation module 522, and an item weighting module 524. In the illustrated embodiment, the domain model module domain model module 506 includes a retraining module 526 and a domain machine-learning model 528. In alternative embodiments, the generic model module 502, corpus generation module 504, and domain model module 506 can include some or all of the functionality described herein but grouped differently into one or more modules. In some embodiments, the functionality described herein is distributed among a plurality of systems, which can include combinations of software and/or hardware based systems, for example Application-Specific Integrated Circuits (ASICs), computer programs, or smart phone applications.

In the illustrated embodiment, the generic model module 502 first trains a generic machine-learning model 514 to determine confidence level of text using generic confidence-level related data. The domain model module 506 then retrains the generic machine-learning model 514 using a corpus of data generated by the corpus generation module 504 that is specific to the members of a project group for a project to be evaluated. This allows domain model module 506 to generate a domain machine-learning model 528 using any unique vocabulary and styles of expressing sentiments used by the members of the project group. The result is a domain-specific project confidence model that identifies the most typical and generic ways to express levels of confidence by including both typical generic terms and project-specific terms in the training data.

In the illustrated embodiment, the generic model module 502 trains the generic machine-learning model 514 using generic corpus data from a data source 516. In some embodiments, the generic corpus data includes common phrases used in general speech and that convey various levels of confidence. In alternative embodiments, the generic corpus data includes other types of data. For example, in some embodiments, the generic corpus data includes audio data in which audible indicators, such as the tone or pace of speech of the speaker, is used as an indicator of a level of confidence. As another example, in some embodiments, the generic corpus data includes video or image data in which visual indicators, such as facial expression or posture of a speaker, is used as an indicator of a level of confidence.

In some embodiments, the generic corpus data from the data source 516 is pre-processed by a data preparation module 508. In some such embodiments, the data preparation module 508 structures the data to make best use of the machine learning model 514. Embodiments of the data preparation module 508 use one or more of the following heuristics:

Linear data transformation: transform the data to make the relationship linear (e.g., log transform for an exponential relationship);

Noise reduction: use data cleaning operations that better expose and clarify the signal in the data, e.g., remove outliers in the output variable (y) where possible;

Collinearity reduction: calculate pairwise correlations for the input data and remove the most correlated to prevent over-fitting of the data due to highly correlated input variables;

Gaussian distribution: transform the input data (e.g., logarithmic or Box-Cox transformation) so that input and output variables have a Gaussian distribution; and Rescale Inputs: scale data using normalization (e.g., rescale data so that values are within a range of 0 and 1) or standardization (e.g., rescale data so that the mean of observed values is 0 and the standard deviation is 1).

The generic model module 502 uses the generic corpus data to train the generic machine-learning model generic machine-learning model 514 to predict levels of confidence conveyed by input data. In some embodiments, the generic model module 502 generates the generic machine-learning model 514 as a classifier that classifies the input data according to different levels of confidence. For example, in some embodiments, the generic machine-learning model 514 classifies input data conveying a high level of confidence, conveying a moderate level of confidence, or conveying a low level of confidence. Embodiments of the generic model module 502 employ supervised, unsupervised, or semi-supervised (e.g., active learning) training techniques to train the generic machine-learning model 514. When the generic model module 502 completes the training of the generic machine-learning model 514, the generic model module 502 provides the generic machine-learning model 514 to the domain model module 506.

In the illustrated embodiment, the corpus generation module 504 generates a domain-specific corpus of data that will be used to retrain the machine-learning model 514 to be trained for evaluating a particular project. To this end, the corpus generation module 504 generates the domain-specific corpus using items indicative of varying levels of confidence that originated from members of a group involved in the project, such as data extracted from communications by or among the group members.

In some embodiments, the item extraction module 518 uses natural language processing (NLP) of unstructured text from historic project member communications to extract target phrases indicative of confidence levels. In some embodiments, the characteristics comparison module characteristics comparison module 520 detects distinguishing characteristics of the domain-specific items by comparing the items and parts of the items, such as words or phrases, to the items in the generic training corpus. The characteristics comparison module characteristics comparison module 520 then adds the distinguishing items to the domain-specific corpus.

In some embodiments, the member correlation module 522 generates labeled data that connects project quality with items that the group members generated while working on that project. For example, in some embodiments, the quality score of past projects are associated with phrases extracted from communications from a group member while working on that past project. Also, in some embodiments, it may be desirable to emphasize the viewpoints of one or more particular members of the project group, for example due to a group member's level of experience, expertise, or seniority. In some such embodiments, the member correlation module 522 correlates the items in the corpus with respective group members associated with the items, for example an audio transcript is associated with the group member that was speaking in the audio recording and a phrase from a report is associated with the group member who authored the report. In some such embodiments, the item weighting module 524 assigns weights to the items associated with the group member or members that are selected for emphasis.

In the illustrated embodiment, the retraining module 526 of the domain model module 506 uses the domain-specific corpus generated by the corpus generation module 504 to retrain the machine-learning model 514. In some embodiments, the domain model module 506 obtains a copy of the domain-specific corpus from the corpus generation module 504 and a copy of the generic machine-learning model 514 from the generic model module 502. In some embodiments, the retraining module 526 retrains the generic machine-learning model 514 to assign confidence values to input data, such as project-related communication items from members of the project group. The retraining module 526 outputs the retrained generic machine-learning model 514 as a domain machine-learning model 528.

Figure 6:
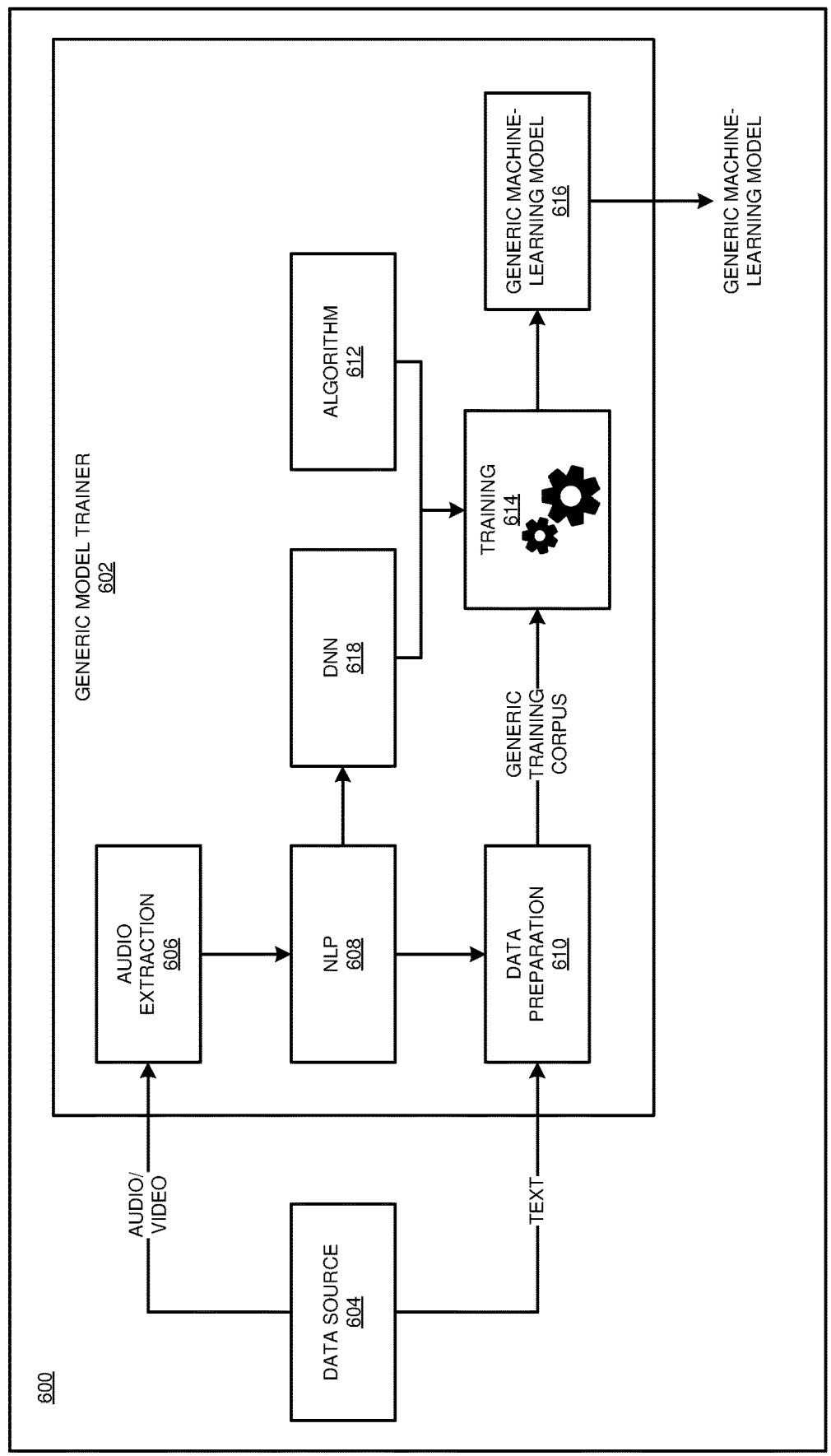
FIG. 6 depicts block diagram of a machine learning environment that includes a generic model module in accordance with an alternative embodiment.

With reference to FIG. 6, this figure depicts block diagram of a machine learning environment 600 that includes a generic model module 602 in accordance with an alternative embodiment. In a particular embodiment, generic model module 602 is an example of generic model module 402 of FIG. 4.

In the illustrated embodiment, the generic model module 602 includes an audio extraction module 606, an NLP module 608, a data preparation module 610, algorithm module 612, training module 614, generic machine-learning model 616, and deep neural network (DNN) 618. In some embodiments, the functionality described herein is distributed among a plurality of systems, which can include combinations of software and/or hardware based systems, for example Application-Specific Integrated Circuits (ASICs), computer programs, or smart phone applications. In the illustrated embodiment, the data preparation module 610, algorithm module 612, training module 614, and generic machine-learning model 616 correspond to the data preparation module 508, algorithm module 510, training module 512, and generic machine-learning model 514, respectively, of FIG. 5. The description of the data preparation module 508, algorithm module 510, training module 512, and generic machine-learning model 514 in connection with FIG. 5 applies equally to data preparation module 610, algorithm module 612, training module 614, and generic machine-learning model 616.

In the illustrated embodiment, the generic model module 602 receives audio and video data and textual data from a data source 604. The audio extraction module 606 receives audio/video data and, in the case of video data, separates audio signals from the video signals in the data. In an embodiment, the audio extraction module 606 outputs the audio to the NLP module 608. The NLP module 608 applies speech-to-text NLP algorithms to generate a text transcription of the incoming audio. In some embodiments, NLP module 608 provides the transcription to the data preparation module 610.

In an embodiment, the DNN 618 receives the audio and/or transcription from the NLP 706. In some embodiments, the DNN 618 applies machine learning algorithms to extract grammatical features of the dialogue (e.g., to identify tone, sentiment, etc.), eliminate noise, identify references to topics related to the project, and/or identify which group member is the speaker in the audio. In some embodiments, the output from the DNN 618 is provided as a feature input for the generic machine-learning model 616. In such embodiments, the output from the DNN 618 is provided to the training module 614 for training the generic machine-learning model 616. In an embodiment, the DNN 618 uses public databases, a pretrained model, and/or historical data from the data source 604 designed to train the DNN 618.

Figure 7:
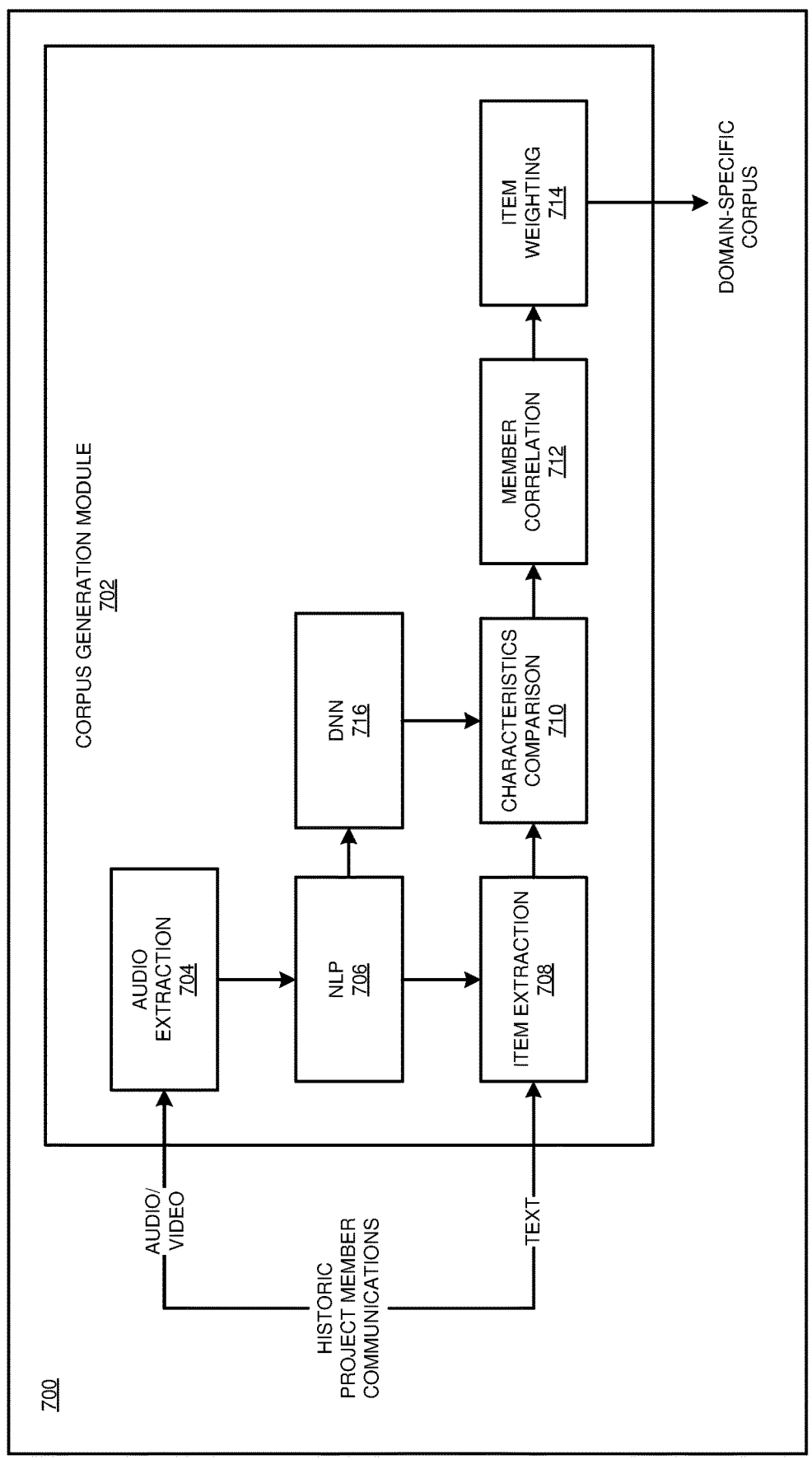
FIG. 7 depicts block diagram of a machine learning environment that includes a corpus generation module in accordance with an alternative embodiment.

With reference to FIG. 7, this figure depicts block diagram of a machine learning environment 700 that includes a corpus generation module 702 in accordance with an alternative embodiment. In a particular embodiment, corpus generation module 702 is an example of corpus generation module 404 of FIG. 4.

In the illustrated embodiment, the corpus generation module 702 includes an audio extraction module 704, an NLP module 706, an item extraction module 708, a characteristics comparison module 710, a member correlation module 712, an item weighting module 714, and a DNN 716. In some embodiments, the functionality described herein is distributed among a plurality of systems, which can include combinations of software and/or hardware based systems, for example Application-Specific Integrated Circuits (ASICs), computer programs, or smart phone applications.

In the illustrated embodiment, the corpus generation module 702 receives audio and video data and textual data as part of the historic project member communications. In the illustrated embodiment, the item extraction module 708, characteristics comparison module 710, member correlation module 712, and item weighting module 714 correspond to the item extraction module 518, characteristics comparison module 520, member correlation module 522, and item weighting module 524, respectively, of FIG. 5. The description of the item extraction module 518, characteristics comparison module 520, member correlation module 522, and item weighting module 524 in connection with FIG. 5 applies equally to item extraction module 708, characteristics comparison module 710, member correlation module 712, and item weighting module 714 unless otherwise noted herein. Also, in the illustrated embodiment, the audio extraction module 704, NLP 706, and DNN 716 correspond to the audio extraction module 606, NLP module 608, and DNN 618. The description of the audio extraction module 606, NLP module 608, and DNN 618 in connection with FIG. 6 applies equally to audio extraction module 704, NLP 706, and DNN 716 unless otherwise noted herein.

The audio extraction module 704 receives audio/video data and, in the case of video data, separates audio signals from the video signals in the data. In an embodiment, the audio extraction module 704 outputs the audio to the NLP module 706. The NLP module 706 applies speech-to-text NLP algorithms to generate a text transcription of the incoming audio. In some embodiments, NLP module 706 provides the transcription to the item extraction module 708 and to the DNN 716. In an embodiment, the DNN 716 receives the audio and/or transcription from the NLP 706. In some embodiments, the DNN 716 applies machine learning algorithms to extract grammatical features of the dialogue (e.g., to identify tone, sentiment, etc.), eliminate noise, identify references to topics related to the project, and/or identify which group member is the speaker in the audio. In some embodiments, the output from the DNN 716 is provided to a domain model module 506 as a feature input for the generic machine-learning model 528. In the illustrated embodiment, the output from the DNN 716 is provided to the characteristics comparison module 710, which uses the output to aide in detecting distinguishing characteristics of the domain-specific items.

Figure 8:
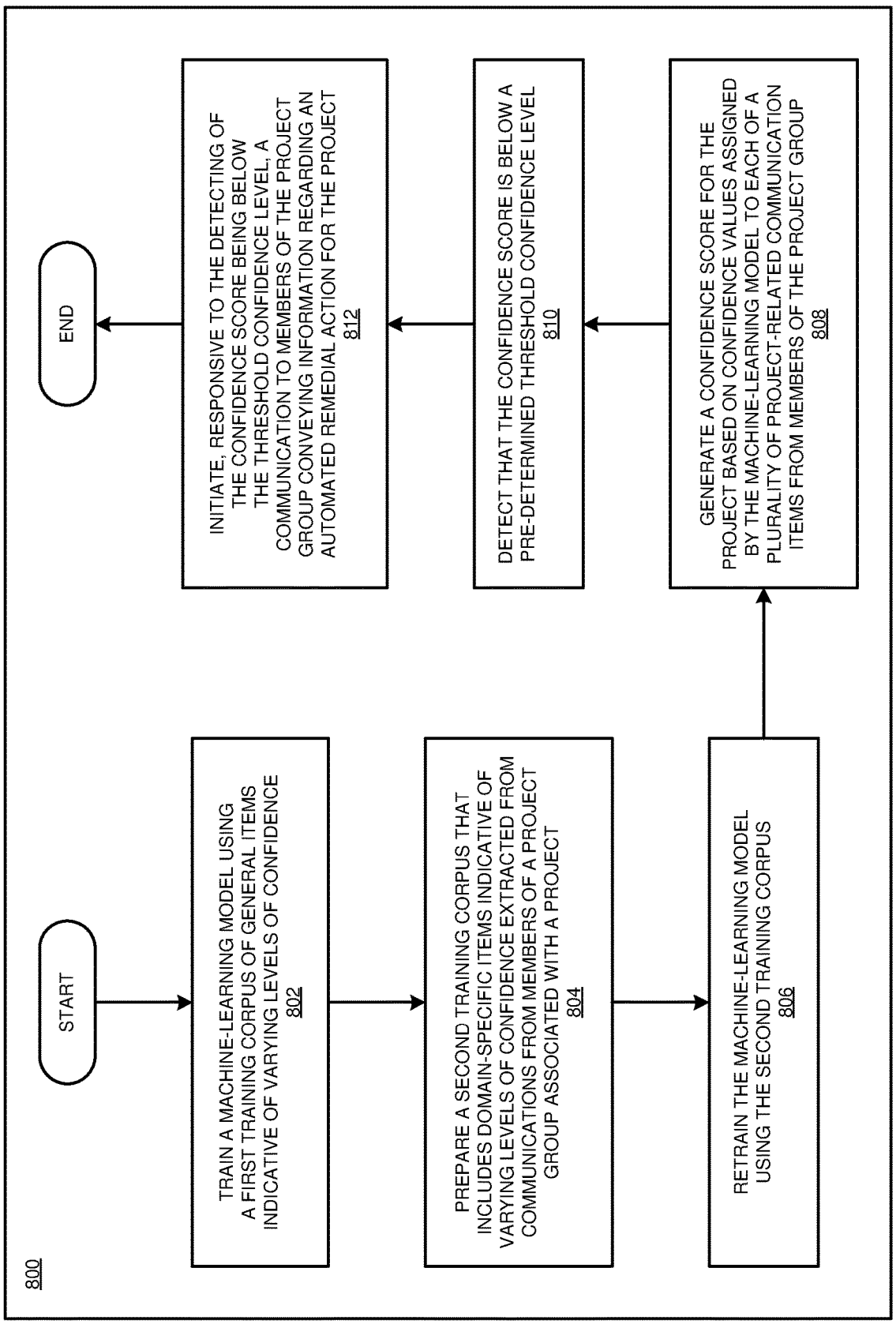
FIG. 8 depicts a flowchart of an example process for confidence analysis in accordance with an illustrative embodiment.

With reference to FIG. 8, this figure depicts a flowchart of an example process 800 for confidence analysis in accordance with an illustrative embodiment. In a particular embodiment, the confidence analysis system 400 of FIG. 4 carries out the process 800.

In an embodiment, at block 802, the process trains a machine-learning model using a first training corpus of general items indicative of varying levels of confidence. Next, at block 804, the process prepares a second training corpus that includes domain-specific items indicative of varying levels of confidence extracted from communications from members of a project group associated with a project. Next, at block 806, the process retrains the machine-learning model using the second training corpus. Next, at block 808, the process generates a confidence score for the project based on confidence values assigned by the machine-learning model to each of a plurality of project-related communication items from members of the project group. Next, at block 810, the process detects that the confidence score is below a predetermined threshold confidence level. Next, at block 812, the process initiates, responsive to the detecting of the confidence score being below the threshold confidence level, a communication to members of the project group conveying information regarding an automated remedial action for the project.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A processor-implemented method comprising:
   training a machine-learning model using a first training corpus of general items indicative of varying levels of confidence;

preparing a second training corpus that includes domain-specific items indicative of varying levels of confidence extracted from each of a plurality of project-related communication items from members of a project group associated with a project, wherein each of the plurality of project-related communication items is associated with a feature of a past project, wherein each of the plurality of project-related communication items is labeled with a quality score of the past project;

retraining the machine-learning model using the second training corpus;

generating a quality score for the project based on a quality metric, the generating the quality score further comprising adding, using a user issued modification command, a new project metric and a weight corresponding to the new project metric, the adding causing a change in the quality score for the project;

generating a confidence score for the project based on the quality score and based on confidence values assigned by the machine-learning model to each of the plurality of project-related communication items from members of the project group, wherein the confidence values are weighted relative to a member expertise level of at least one member contributing at least one communication item of the plurality of project-related communication items;

setting a threshold granularity, wherein the threshold granularity defines at least one predetermined threshold confidence level;

detecting that the confidence score is below a predetermined threshold confidence level of the at least one predetermined threshold confidence levels; and initiating, responsive to the detecting of the confidence score being below the predetermined threshold confidence level, a communication to members of the project group conveying information regarding the confidence score being below the predetermined threshold confidence level and an automated remedial action for the project associated with the one or more of the least more threshold confidences levels.

2. The method of claim 1, wherein the first training corpus comprises a plurality of phrases conveying respective levels of confidence.

3. The method of claim 2, wherein the plurality of phrases comprises a phrase conveying a high level of confidence, a phrase conveying a moderate level of confidence, and a phrase conveying a low level of confidence.

4. The method of claim 1, wherein the preparing of the second training corpus includes natural language processing of unstructured text from the communications.

5. The method of claim 1, wherein the preparing of the second training corpus includes natural language processing of audio from the communications.

6. The method of claim 1, wherein the preparing of the second training corpus includes correlating the domain-specific items with members of the project group.

7. The method of claim 6, wherein the preparing of the second training corpus includes assigning a weight to one of the domain-specific items based on a seniority level of an associated member of the project group.

8. The method of claim 1, wherein the preparing of the second training corpus includes detecting distinguishing characteristics of the domain-specific items based on a comparison of the domain-specific items to the first training corpus.

9. The method of claim 8, wherein the preparing of the second training corpus includes applying the distinguishing characteristics to the first training corpus.

10. The method of claim 1, wherein the retraining of the machine-learning model includes training the machine learning model to classify audio based on tone of the audio.

11. The method of claim 1, wherein the generating of the confidence score includes generating a transcript of audio using speech-to-text natural language processing.

12. The method of claim 1, wherein the automated remedial action includes performance testing of the project.

13. The method of claim 1, wherein the initiating of the communication to members of the project group includes accessing calendaring software of members of the project group to schedule a meeting of the members of the project group.

14. A computer program product comprising one or more computer readable storage media, and program instructions collectively stored on the one or more computer readable storage media, the program instructions executable by a processor to cause the processor to perform operations comprising:

training a machine-learning model using a first training corpus of general items indicative of varying levels of confidence;

preparing a second training corpus that includes domain-specific items indicative of varying levels of confidence extracted from each of a plurality of project-related communication items from members of a project group associated with a project, wherein each of the plurality of project-related communication items is associated with a feature of a past project, wherein each of the plurality of project-related communication items is labeled with a quality score of the past project;

retraining the machine-learning model using the second training corpus;

generating a quality score for the project based on a quality metric, the generating the quality score further comprising adding, using a user issued modification command, a new project metric and a weight corresponding to the new project metric, the adding causing a change in the quality score for the project;

generating a confidence score for the project based on the quality score and based on confidence values assigned by the machine-learning model to each of the plurality of project-related communication items from members of the project group, wherein the confidence values are weighted relative to a member expertise level of at least one member contributing at least one communication item of the plurality of project-related communication items;

setting a threshold granularity, wherein the threshold granularity defines at least one predetermined threshold confidence level;

detecting that the confidence score is below a predetermined threshold confidence level of the at least one predetermined threshold confidence levels; and initiating, responsive to the detecting of the confidence score being below the predetermined threshold confidence level, a communication to members of the project group conveying information regarding the confidence score being below the predetermined threshold confidence level and an automated remedial action for the project associated with the one or more of the least more threshold confidences levels.

15. The computer program product of claim 14, wherein the stored program instructions are stored in a computer readable storage device in a data processing system, and wherein the stored program instructions are transferred over a network from a remote data processing system.

16. The computer program product of claim 14, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:
   program instructions to meter use of the program instructions associated with the request; and
   program instructions to generate an invoice based on the metered use.

17. The computer program product of claim 14, wherein the preparing of the second training corpus includes detecting distinguishing characteristics of the domain-specific items based on a comparison of the domain-specific items to the first training corpus.

18. A computer system comprising a processor and one or more computer readable storage media, and program instructions collectively stored on the one or more computer readable storage media, the program instructions executable by the processor to cause the processor to perform operations comprising:
   training a machine-learning model using a first training corpus of general items indicative of varying levels of confidence;
   preparing a second training corpus that includes domain-specific items indicative of varying levels of confidence extracted from each of a plurality of project-related communication items from members of a project group associated with a project, wherein each of the plurality of project-related communication items is associated with a feature of a past project, wherein each of the plurality of project-related communication items is labeled with a quality score of the past project;
   retraining the machine-learning model using the second training corpus;
   generating a quality score for the project based on a quality metric, the generating the quality score further comprising adding, using a user issued modification command, a new project metric and a weight corresponding to the new project metric, the adding causing a change in the quality score for the project;
   generating a confidence score for the project based on the quality score and based on confidence values assigned by the machine-learning model to each of the plurality of project-related communication items from members of the project group, wherein the confidence values are weighted relative to a member expertise level of at least one member contributing at least one communication item of the plurality of project-related communication items;
   setting a threshold granularity, wherein the threshold granularity defines at least one predetermined threshold confidence level;
   detecting that the confidence score is below a predetermined threshold confidence level of the at least one predetermined threshold confidence levels; and
   initiating, responsive to the detecting of the confidence score being below the predetermined threshold confidence level, a communication to members of the project group conveying information regarding the confidence score being below the predetermined threshold confidence level and an automated remedial action for the project associated with the one or more of the least more threshold confidences levels.

19. The computer system of claim 18, wherein the preparing of the second training corpus includes detecting distinguishing characteristics of the domain-specific items based on a comparison of the domain-specific items to the first training corpus.

* * * * *